United States Patent [19]
Chang

[11] Patent Number: 5,903,457
[45] Date of Patent: May 11, 1999

[54] AUTOMATED MATERIAL STORAGE AND RETRIEVAL SYSTEM FOR PRODUCTION LINES

[75] Inventor: Shunder Chang, Tai-Chung, Taiwan

[73] Assignee: Moci Co., Ltd., Tai-Chung, Taiwan

[21] Appl. No.: 08/857,677

[22] Filed: May 16, 1997

[51] Int. Cl.[6] .............................. G06F 19/00; G06G 7/66
[52] U.S. Cl. .............................. 364/468.01; 364/469.01; 364/478.01; 414/786; 414/787
[58] Field of Search ......................... 364/468.01, 469.19, 364/478.02; 414/787, 786, 331, 236, 273, 636, 279, 666, 635, 282

[56] References Cited

U.S. PATENT DOCUMENTS 5,222,855  6/1993  Bernard, II et al. .................... 414/331
5,407,316  4/1995  Coatta et al. .......................... 414/787

*Primary Examiner*—William Grant
*Assistant Examiner*—McDieunel Marc
*Attorney, Agent, or Firm*—Bacon & Thomas, PLLC

[57] ABSTRACT

An automated material handling process in production lines and an automated material storage and retrieval system for production line. Six material retrieval operating modes are disclosed and electronic label devices are used for instructing the operators how and where to implement the material retrieval or storage in each operating mode. Timely distribution of production materials can be achieved with optimized inventory status.

7 Claims, 4 Drawing Sheets

AUTOMATED MATERIAL STORAGE AND RETRIEVAL SYSTEM FOR PRODUCTION LINES

BACKGROUND OF THE INVENTION

1. Field of the Invention

This invention relates in general to an automated material handling process in production lines and an automated material storage and retrieval system for production line. In particular, this invention relates to an automated storage and retrieval means for use in the manufacturing facilities that require small quantities of large number categories of materials and/or components with optimized efficiency and inventory status.

2. Technical Background

Material mis-management in production operations in the computer and communication hardware manufacturing companies is frequently the major cause for severe financial damages in this high-tech industry. The computer and communication hardware manufacturing industry is characterized by several phenomenon that are distinguished from other manufacturing industries.

First of all, the computer and communication hardware manufacturing business is well known for its vast variety of product items. In managing raw materials for a vast variety of products, complication in material categories and flow control complicate the management problem. Then, there is the typical fast delivery requirement placed by customers. As most of the computer and communication hardware product manufacturers always face severe competition, lead time for product orders becomes an important factor in the competition. Basically, rapid delivery after confirmed order is necessary. Otherwise, the customer turns to other suppliers, and therefore slow delivery means higher possibility of losing business opportunities.

The computer and communication hardware product manufacturing industry is also characterized by the short product life cycles. Typical product life cycles are frequently less than one year. Product designs must be improved constantly to meet user demands. Once a particular product is upgraded, some of its original components become obsolete, at least in the later version of the product. If the surplus components or materials can not find their use in other products as soon as possible, then they become waste inventory.

Further, materials used for the production of computer and communication hardware are frequently small in their physical sizes yet have relatively high unit prices. They tend to be lost in the storage warehouse or warehousing area if the inventory data is not properly controlled. Once forgotten and lost in the warehouse, these components become obsolete even if they were recovered after a period of time. The typical high unit prices amplify the lost in material costs for the manufacturer.

Note that computer and/or communication product manufacture requires the use of various types of materials or components. In many occasions, a raw material used for the manufacture is itself a component made up of its own raw materials. For convenience, the term material will be used to generally designate either the materials or the components used for such manufacturing activities. Meanwhile, the term warehouse will be used in the following text to designate the storage space used for stocking the production materials, either it is a physically isolated room or house for such purpose, or a simple designated warehousing area.

Thus, due to the above-distinguished characteristics, material management in computer and communication hardware product manufacturers becomes severely important for the profit ability. For example, insufficient material reserve delays delivery of product, and sometimes even leads to complete lost of business. Excessive material supply leads to dead material inventory that stagnates capital flow, and even eats up capital if the surplus of material was not properly consumed rapidly in other product lines.

In order to cope with these material management problems for computer and communication hardware product manufacturing business, vendors have started to employ material requirement planning (MRP) procedures that are based on factory control systems including master production schedule (MPS), bill of material (BOM) control, as well as inventory information. Calculations are made to determine items, quantities and time schedule for the required materials.

However, many of the warehouses used for the raw material storage are still operating in the conventional manner. In these warehouses, materials are stored in shelves, and sometimes some of the materials are temporarily placed alongside the production lines, it is quite difficult to maintain realtime inventory control via inventory counting. Unrealistic inventory records therefore leads to low-efficiency material control for these storage facilities.

To solve the inventory control problems as outlined above for the computer and communication hardware product manufacturers, automated and highly-efficient warehousing system must be developed. These automated warehousing systems must be able to allow for rapid access to the stored inventory, maintain realistic record of the quantities and positions of all the stored materials, and capable of linking with the MRP system.

The concept of automated storage and retrieval means (ASRS) is one such warehousing system that has been developed to meet such needs. Though ASRS has been around for a period of time, however, it was designed for the material storage and retrieval emphasizing the control of large quantities of small categories of materials. This essentially contradicts the requirement of computer and communication hardware product manufacturers that needs to handle relatively large categories of small quantities of materials.

For the purpose of description of the invention, more details of the conventional ASRS are examined herein. Based on the physical units of material storage and retrieval, the conventional ASRS can be summarized in Table 1 below.

TABLE 1

| Retrieval Method | Storage Unit | Retrieval Unit |
|---|---|---|
| 1 | Pallet | Pallet |
| 2 | Pallet | Case |
| 3 | Carton | Carton |
| 4 | Carton | Case |
| 5 | Case | Case |
| 6 | Case | Piece |
| 7 | Piece | Piece |

In the table above, carton is defined to be a larger box that contains a number of cases of material. Some materials are too small that should be stored in cases containing a multiple number of them.

Based on weighting at storage and retrieval, operation of the conventional ASRS can be categorized between the heavy- and light-weight handling systems. Light-weight handling ASRS. Light-weight ASRS handling systems employ the scheme of the fifth item in Table 1 above. A comparison of methods 1, 3 and 5 in the Table shows that the units of storage and retrieval are the same, either pallet, carton or case. Conventional ASRS are suitable for the storage and retrieval of the same units, preferably physically large units such as pallets or cartons. This, in particular, is very suitable for warehouses of large companies. For typical computer and communication hardware product manufacturers, methods 6 and 7 are preferable. Inventory items are stored in units of case and retrieved in single items. Sometimes single items are stored and retrieved as well. Thus, such are procedures for ASRS not suitable for computer and communication hardware product manufacturers.

In general, the operation of material delivery to the production lines in the computer and communication hardware product manufacturing facilities are not rigorous enough, frequently with large amounts and categories of materials stacked alongside the production lines. Some of these materials may be needed immediately, while others may not. Thus, the conventional material delivery operation in computer and communication hardware product manufacturing facilities are characterized by at least the following drawbacks.

First of all, retrieval of a material in this manner is prone to mistakes. Since all the materials are stacked alongside the production line, it is not only more difficult to locate the right inventory in the stacked piles, but also there is the high possibility of fetching the wrong material.

Secondly, the stacked piles of materials in the proximity of the production lines constitute possible obstacles for the access to the production line by both the line operators and the necessary equipments.

Next, there is the high possibility that valuable materials might be lost either intentionally or unintentionally. A possible scenario is that some high-cost microprocessor or memory IC are found lost only after a batch of product is processed. Even so, it is difficult to try to trace the whereabout of the missing materials and how they were missing since it has been a period of time from the incidence.

Then, there is the problem of incorrect and unrealistic inventory record. Most of the materials used for the production operations are stockpiled along side the production line. Since the piling is most certainly in the manner arranged for the convenience of the retrieval from the line, not for the management of the materials themselves, therefore, it is frequently the situation that the corresponding records supposed to reflect the status of the categories, quantity and even locations of the materials are not correct. This raises problems for the inventory control. Bad inventory control in turn leads to poor material demand planning, and as a result, overall manufacturing efficiency deteriorates.

Thus, computer and communication hardware product manufacturing is frequently characterized by the requirement of small quantities of large model numbers of products. Sometimes batches of about several thousands or even hundreds of pieces of a particular product model is required to be manufactured. For a manufacturer to handle these small batches of various product models efficiently (i.e., in a profitable manner), inventory control must be precise. Material reserve in stock must be calculated in the daily basis, sufficient only for the latest order of production. Since, as mentioned, these materials are usually small in physical sizes, each occupying only a small warehousing space in the ASRS, it is therefore impractical to use separate cases for each piece of the material. If too few material pieces are stored in one unit of case in the ASRS, excessive storage and retrieval accesses performed by the elevated and railed mechanical access mechanism would not only produce delays in the fetching of raw material to the production lines but would also wear out the mechanism prematurely. In worst cases, the entire mechanism might even be paralyzed.

SUMMARY OF THE INVENTION

It is therefore an object of the present invention to provide an automated material storage and retrieval system capable of improved production material inventory maintenance.

It is another object of the present invention to provide an automated material storage and retrieval system capable of improved production efficiency.

The present invention achieves the above-identified objects by providing a material handling system that is suitable for storage and retrieval of small quantities of large number of categories of production material. The system has a number of storage boxes each containing a single or a multiple of compartments. An automated storage and retrieval mechanism has a number of storage racks arranged in parallel each having a multiple storage spaces each used for the storage of a storage box. At least one station is arranged at one end of each of the storage racks, and at least a mechanical access mechanism is installed alongside each of the storage racks that is movable parallel to the corresponding storage rack. The mechanical access mechanism has an access plate that is vertically movable between the storage spaces of the storage rack for storing and retrieving a corresponding storage box into and output the respective storage space from and to the station. Each of several electronic labels is assigned to a corresponding station, each of the electronic labels is connected to a governing computer system that maintains the inventory data of the material handling system, and has at least a display unit for displaying material access information. The operators of the material handling system may implement the material storage and retrieval accesses based on the information displayed over the display unit of the electronic labels.

BRIEF DESCRIPTION OF THE DRAWING

Other objects, features, and advantages of the present invention will become apparent by way of the following detailed description of the preferred but non-limiting embodiments. The description is made with reference to the accompanied drawings in which.

DETAILED DESCRIPTION OF THE PREFERRED EMBODIMENTS

Figures 1A, 1B:
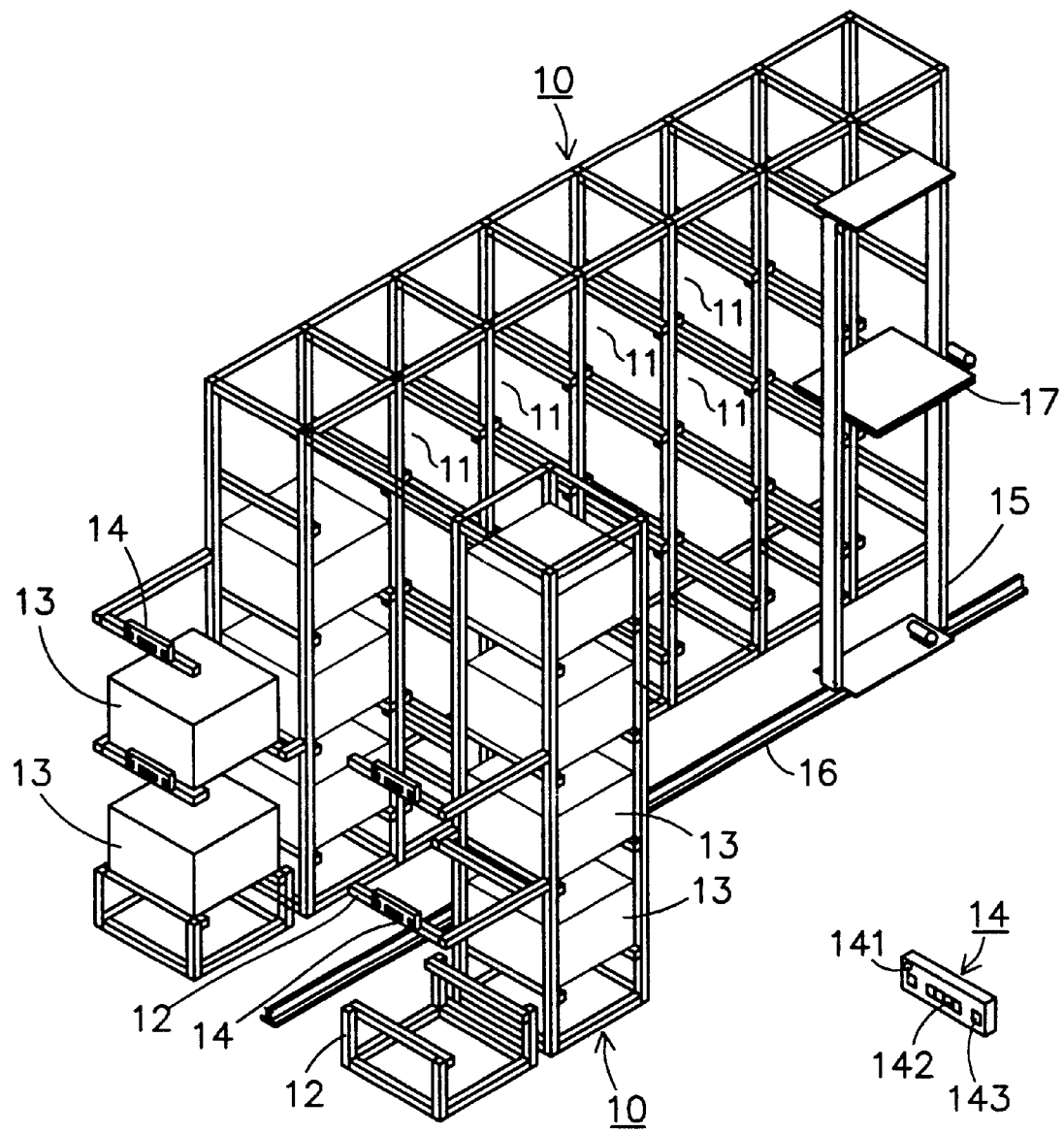
FIG. 1A is a perspective view showing the warehousing system capable of handling small quantities of large number of material types.
FIG. 1B schematically shows the electronic label for use in the warehousing system in accordance with a preferred embodiment of the invention.

For a detailed description of the preferred embodiments of the invention, a system-wise description is first given in the following sections. As a preferred embodiment of the automated warehousing storage and retrieval system of the invention, one is that which can be built around a conventional ASRS. Refer to FIG. 1A of the drawing, in which a warehousing system capable of handling small quantities of large number of material types is shown in a perspective view. This is a standard ASRS having a multiple number of storage racks 10 aligned in multiple rows. FIG. 1A shows one row of storage rack 10 contains a multiple number of storage spaces 11 arranged in vertical and horizontal frameworks. A second row of storage rack 10 is shown only partially, with one vertical stacking of the storage spaces 11 shown in the drawing.

Each row of storage rack 10 is shown to have two stations 12 attached to one end thereof. As is illustrated, these two stations 12 are arranged one above the other at the end of the row 10 closer to the observer of the drawing. Each of the two stations can accommodate one placement of one storage box 13. Each of the stations 12 also has an electronic labeling device 14 attached. Each of these electronic labels are coupled to a control computer system of the ASRS via suitable means, for example, electronic signal wiring system.

Within the elongated passage way between two consecutive storage racks 10, there can be arranged a storage and retrieval mechanism, generally identified in the drawing by reference numeral 15. This can be a mechanism that handles the storage and retrieval of materials into and out of the storage spaces 11 respectively. The mechanism 15, in order to gain access to all the storage spaces 11 in its corresponding row of storage rack 10, is typically operated over a guide rail system 16 that extends along the passage way immediately alongside the rack framework. The mechanism 15 is also complete with a material access plate 17 that can be driven vertically to gain access to the storage space 11 in different heights in the storage rack 10. A driving mechanism not detailed in the drawing allows the access plate 17 to move in and out of the aligned storage space 11 in the direction normal to the plane of the entire storage rack 10. Thus, any storage box 13 can be either retrieved out of or stored into its assigned storage space 11 in the storage rack 10, and placed onto or picked up from one of the stations 12 correspondingly. As is known, such operations can best, and in practical senses must, be controlled by a governing computer system not shown in the drawing.

The electronic labels 14 can be one that disclosed in the Republic of China Patent Application No. 8411350. Except for the use of such electronic labels 14 in the designation of the information in relation to the accessed material, details thereof would not be elaborated herein. The use of such electronic labels 14 is, in essence, necessary for the efficient operation of ASRS for the handling of small quantities of large number of categories of materials that is typical in the manufacture of computer and communication hardware products.

FIG. 1B schematically shows the electronic label 14 for use in the warehousing system in accordance with a preferred embodiment of the invention. As is illustrated, each of the electronic label 14 has a light 141, whose light-on status can be used to designate the request for access to the material in the storage box 13 held in the station 12. In one example, the electronic label 14 has a four-digit numeric, alphanumeric, or Chinese character display 142 that is used to display the concerned information. If the necessary information is more than four digits, a scrolling display scheme can be used to, for example, show the first part of four digits in the four-digit display for a specified period of time of, say, 2 to 3 seconds, and then the second part thereof displayed in succession. Once the entire information is displayed complete in several scrolling cycles, a renewed cycle can repeat again, until the confirm button 143 is pressed after the requested access to the bearing storage box 13 is performed. If there is another storage box 13 being sent to the station 12 that requires access, a new set of information is then relayed anew to the electronic label. Otherwise, the light 141 goes off.

Figure 2:
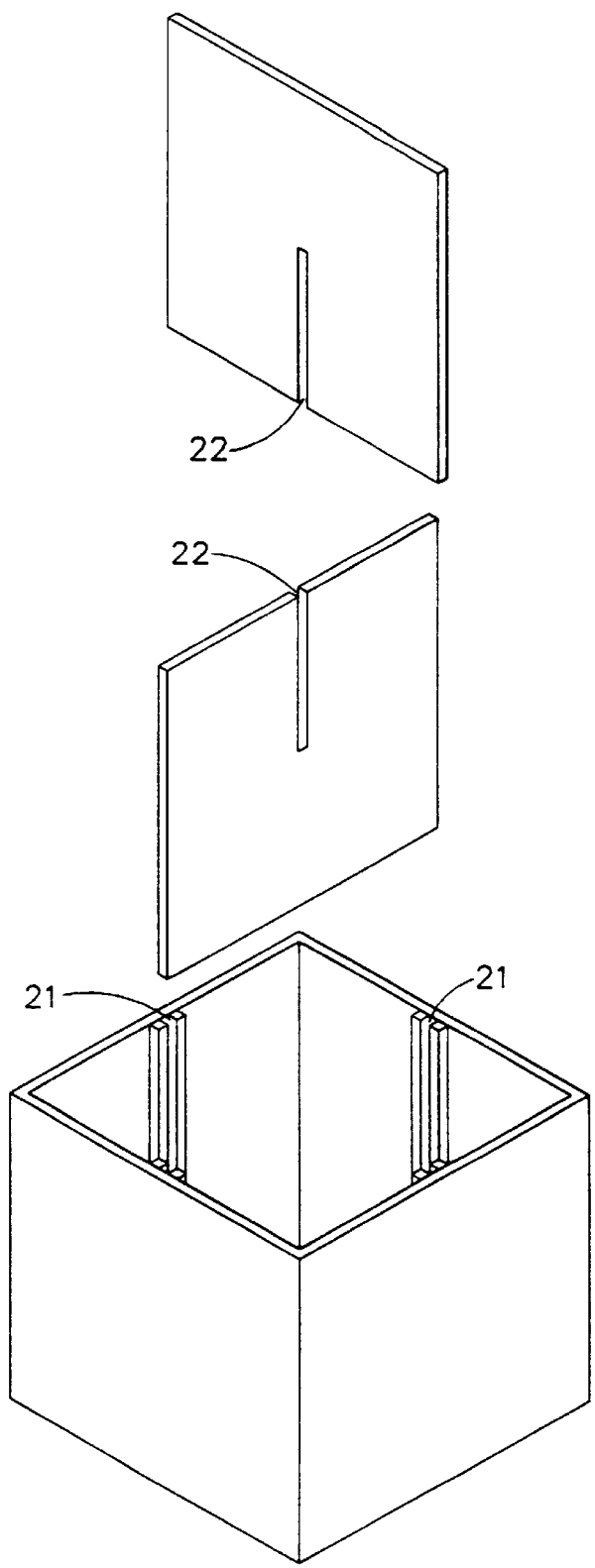
FIG. 2 is a perspective view showing the material box suitable for use in the warehousing system in accordance with the preferred embodiment of the invention with the partitioning plates internal to the box disassembled.

FIG. 2 is a perspective view showing the material box 13 suitable for use in the automated material storage and retrieval system in accordance with the preferred embodiment of the invention. The drawing shows that the two partitioning plates 18 internal to the box 13 are disassembled. These partitioning plates 18 can have side edges thereof inserted into the corresponding guide slots 21 formed on the side panels of the box 13. In this depicted example, each of the two partitioning plates 18 can have formed along the central vertical axis thereof a cutting slot 22 that allows the two plates 18 to be crossed to each other when installed inside the storage box 13. The depicted example of the storage box 13 of FIG. 2 can have up to four partitioned compartments inside the box when both partitioning plates 18 are installed. Two compartments can be obtained using only one partitioning plate 18.

Next, the storage and retrieval operation of materials in the automated material storage and retrieval system of the invention is described in the following paragraphs. Specifically aimed at the improvement of material control for the manufacturing of computer and communication hardware products that are characterized by physically small sizes and vast number of categories, the automated material storage and retrieval system of the invention performs raw material distribution to the production lines in a timely and rightly manner. All the materials necessary for the production operation are stored in the warehouse before the production operations begin. All materials are registered in the control computer system data after delivery. All the materials with the quantity required for a specified period of production time in the lines are timely distributed to the site from the storage locations in the warehouse. The distribution may be arranged daily, every production shift, or every few hours, depending on the actual situations. All materials retrieved out of the material storage and retrieval system are also registered, so that the control computer system can maintain a precise data that reflects the actual inventory level.

For the convenience of delivery of the involved materials, each production work station can have its own assigned material cart or carts. Depending on the actual situation each work station may be assigned two to five carts, and they may be categorized as one of three types. The first type of material cart is used to carry only one type of material specific to that particular work station. Or, the assigned material cart may be used to deliver multiple types of materials. In this case, the carrying space of the cart can be divided into several areas each assigned to one particular type of material. Alphabets can be used to distinguish between the assigned areas. Such carts are frequently used for the delivery of small materials. A third type of cart is the mixed-material cart that is used to deliver various materials for some work stations. This allows for production line operation flexibility that leads to improved production efficiency as well as reduced inventory levels.

Mixed-material cart concept is suitable for mixed production operation. In the mixed production operation, a multiple number of different product types can be manufactured on the same production line. Say, for example, three types of product designated as A, B and C each with a quantity of 50 are to be produced in a mixed A—then—B—then—C manner in the same line. Assume each of the mixed-material cart has the carrying spaces divided into several tens of grids. The grids can be number or arranged in alphabetical order, with each of the grids storing one material that must be used for the production operation. The storage of materials in the orderly arranged grids of the mixed-material cart is in the manner corresponding to the order of production operation of the A, B and C types of product in the line. A production line operator can easily pick up the material in the arranged order of the cart without much consideration. Such mixed production operation saves manpower and reduces complication to the production line operator. However, relatively difficult material preparation operation somewhat limits the application of such mixed production schemes.

A typical manufacturing facility may have installed more than a couple of production lines normally identified alpha-numerically. Each of the production lines may have arranged several work stations also alphanumerically identified. For example, the third work station in B production line can be identified as work station B3. Most of the work stations would normally be assigned with more than one material carts. Thus, quite some carts would be assigned to an entire production line. These carts are also properly identified to show their relationship with the attached work stations. For example, a cart identified by the labeling of
Work Station B3 Cart 12 indicate that it is the twelfth cart for work station 3 in production line B.

Proper material cart identification system is necessary for smooth and efficient operation of the automated material storage and retrieval systems. Essentially, cart identification is used for material retrieval, while the work station identification is used for the delivery of the retrieved materials to the designated destination. In some occasions, the manufacturing facility has arranged therein a single long production line. When the total number of material carts used exceeds 100, it becomes necessary to subdivide the entire line into several shorter line sections. Each of the short sections can then be treated as an independent production line in the sense of production material distribution.

As mentioned above, each of the storage boxes used in the automated material storage and retrieval system can be used to store one or a multiple types of material. For the purpose of clarity, those storage boxes storing a single type of material are referred to herein as single-type material boxes, while those storing multiple types of materials as multiple-type boxes.

Thus, in the described embodiment of the material storage and retrieval system of the invention would be required to process two types of storage boxes and distribute them into three types of material cart arrangements. This means there are a total of six retrieval access modes to be performed concerning the retrieval of materials in the facility. These operating modes will be described in the following sections.

First of the six possible modes of material retrieval operation performed by the described material storage and retrieval system embodiment of the invention involves the retrieval of material in a single-type storage box onto the single-type cart. For this particular mode of material retrieval operation, the information involved includes the "quantity of material retrieval" and "cart identification". Thus, the electronic label used in relation to this retrieval operation would prompt to the operator with these information. For example, with reference back to FIG. 1B, the information display 142 may be displaying both the information representing "_100" and "⇒10_" in successively scrolled display cycles. This can be translated into the requirement that 100 pieces of materials should be picked up from the storage box identified by the electronic label and put into the material cart identified by the number 10.

In the second mode of material retrieval operation, the operation performed involves the retrieval of material in a single-type storage box onto the multiple-type cart. For this mode of material retrieval operation, the information involved includes the "quantity of material retrieval" and "cart identification," as well as the "grid identification" in that cart. The electronic label used in relation to this retrieval operation would prompt to the operator with these information. For example, the information display 142 may be displaying both the information representing "_50" and "⇒12A" in successively scrolled display cycles. This can be translated into the requirement that 50 pieces of materials should be picked up from the storage box identified by the electronic label and put into grid A of the material cart identified by the number 12.

In the third mode of material retrieval operation, the operation performed involves the retrieval of material in a single-type storage box onto the mixed-type cart. For this mode of material retrieval operation, the information involved includes the "cart identification" and the "grid identification" in the cart. The electronic label used in relation to this retrieval operation would prompt to the operator with these information. For example, the information display 142 may be displaying both the information representing "_⇒15" and "ACGH" in successively scrolled display cycles. This can be translated into the requirement that four pieces of materials should be picked up from the storage box identified by the electronic label and put into grid A, C, G and H of the material cart identified by the number of 15. In the described embodiment, since the electronic label used displays at most four digits of information at the same time, if there are more than four grids in the cart to fill, the information display 142, as mentioned above, can scroll over all the grid identifications in successive display cycles. Four digits at a time is easily remembered by operators and reduces the probability of picking up wrong material and put into the wrong grid location.

In the fourth mode of material retrieval operation, the operation performed involves the retrieval of material in a multiple-type storage box onto the single-type cart. For this mode of material retrieval operation, the information involved includes the "storage box compartment identification" and the "cart identification". The electronic label used in relation to this retrieval operation would prompt to the operator with these information. For example, the information display 142 may be displaying both the information representing "B100" and "⇒13_" in successively scrolled display cycles. This can be translated into the requirement that 100 pieces of materials should be picked up from the B compartment of the storage box identified by the electronic label and put into the cart identified by the number 13.

In the fifth mode of material retrieval operation, the operation performed involves the retrieval of material in a multiple-type storage box onto the multiple-type cart. For this mode of material retrieval operation, the information involved includes the "storage box compartment identification" the "quantity of material retrieval" and the "grid identification" in the cart designated. The electronic label used in relation to this retrieval operation would prompt to the operator with these information. For example, the information display 142 may be displaying both the information representing "A110" and "⇒15B" in successively scrolled display cycles. This can be translated into the requirement that 110 pieces of materials should be picked up from the A compartment of the storage box identified by the electronic label and put into the grid B of the cart identified by the number 15.

In the sixth mode of material retrieval operation, the operation performed involves the retrieval of material in a multiple-type storage box onto the mixed-type cart. For this mode of material retrieval operation, the information involved includes the "storage box compartment identification," "cart identification" and the "grid identification" in the cart designated. The electronic label used in relation to this retrieval operation would prompt to the operator with these information. For example, the information display 142 may be displaying both the information representing "B→14" and "ACD_" in successively scrolled display cycles. This can be translated into the requirement that three pieces of materials should be picked up from the B compartment of the storage box identified by the electronic label and put into the grids A, C and D respectively of the cart identified by the number 14.

Though the above description mentioned that the "quantity" of the retrieved materials referred to single pieces thereof, however, these "quantities" may also be used to designate dozens, boxes, or other applicable units of material. In the above-described six modes of material retrieval operations, identical formats of information displayed and identical sequences of material retrieval were used. Namely, the information is handled in the format outlined as "compartment identification" of the storage box, "quantity of material retrieval", the indicating symbol "→", the "cart identification", and the "grid identification" in the concerned cart. Since multiple modes of retrieval operations are possible, therefore, such unified sequence and format of information display can be employed to ensure that operators' operations result in less mishandling. The symbol "→", or any other applicable symbol (referred to also as "INTO" symbol in this text), can be used to indicate the instruction that the retrieved material should be placed "into" the designated location in the cart concerned.

Figure 3:
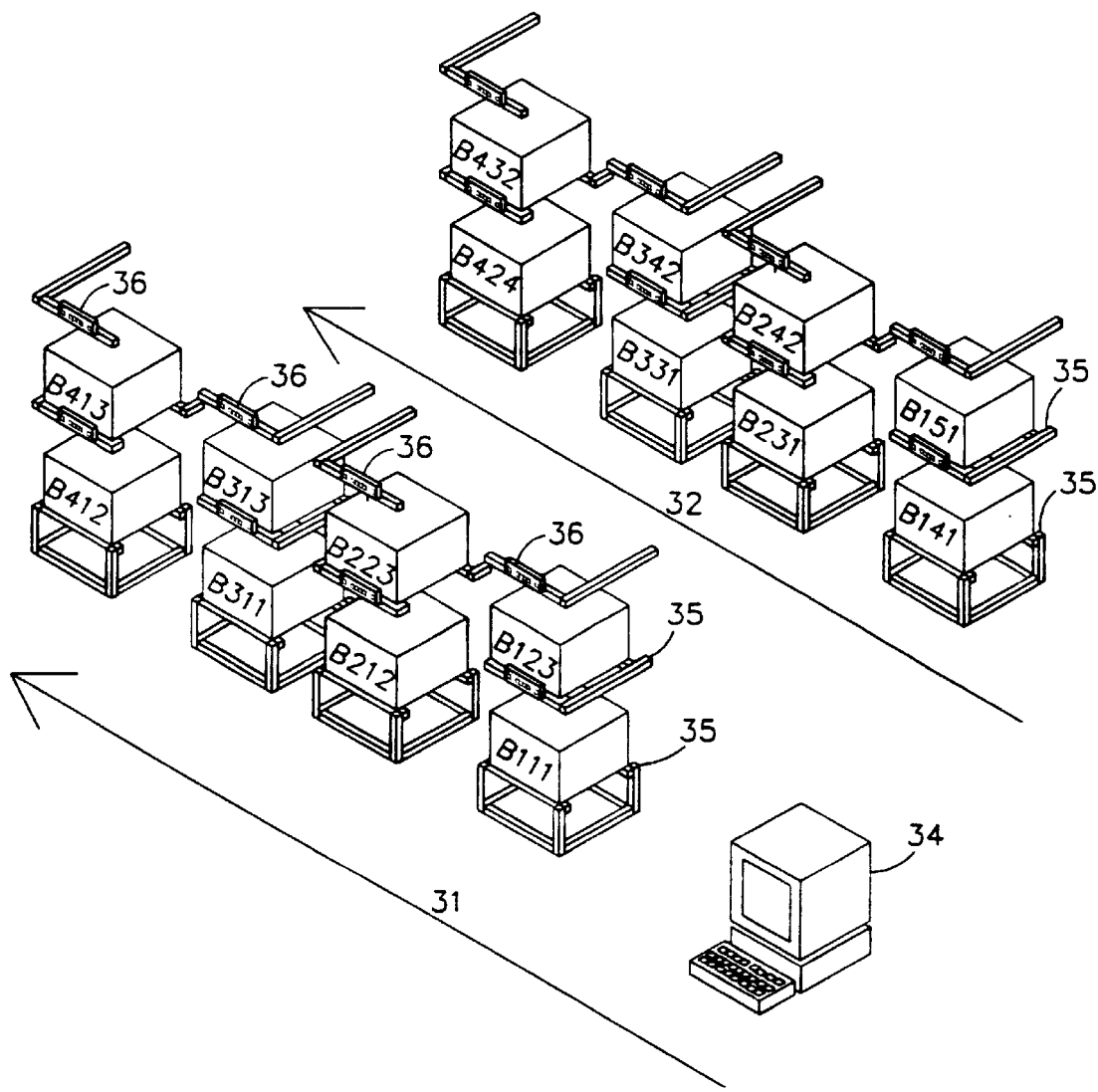
FIG. 3 is a perspective view schematically showing the line of movement conducted in the warehousing system in accordance with the preferred embodiment of the invention.
Figure 4:
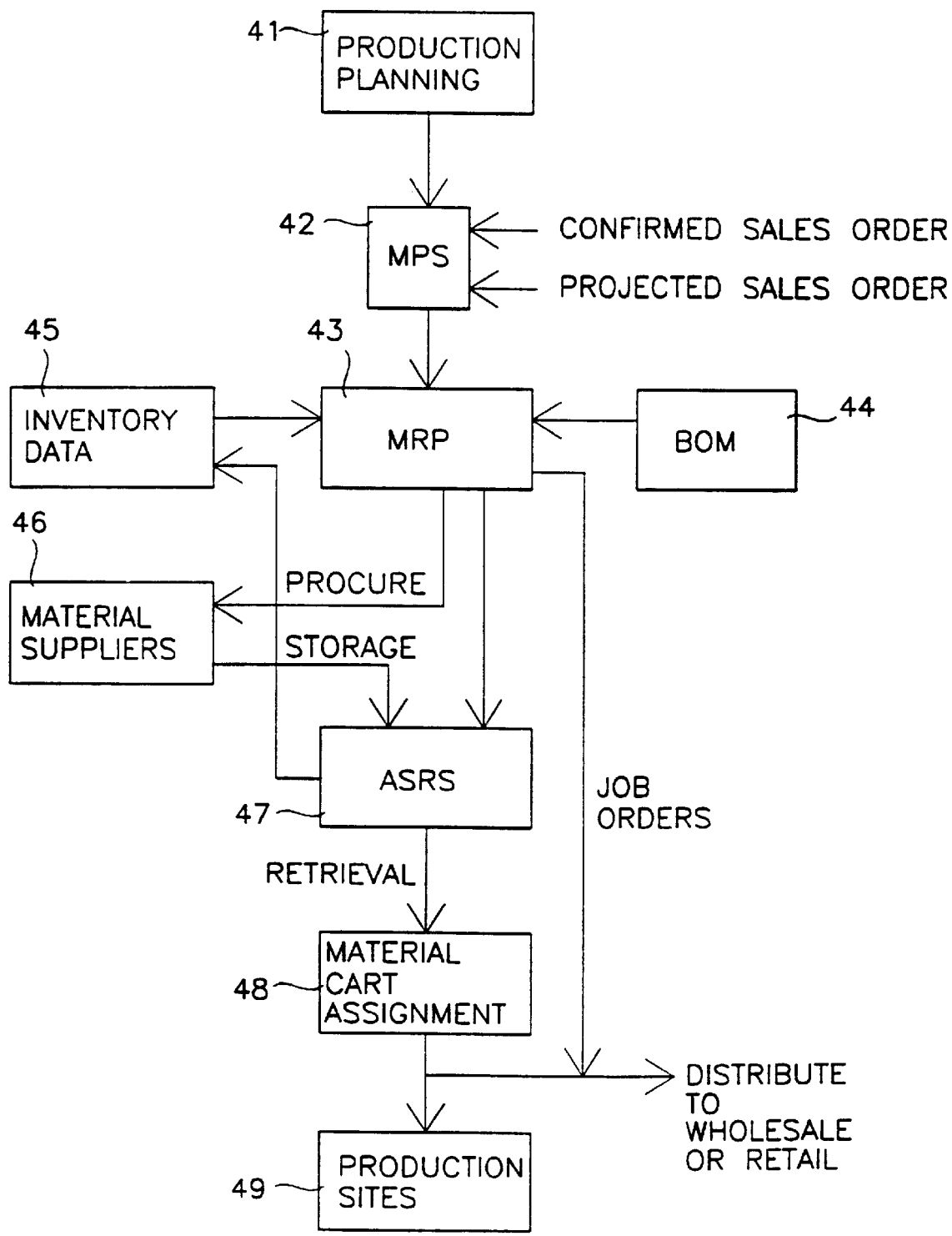
FIG. 4 is a flow diagram depicting the control flow of the warehousing system in accordance with the preferred embodiment of the invention.

FIG. 3 is a perspective view schematically showing the line of movement conducted in the warehousing system in accordance with the preferred embodiment of the invention. As is illustrated, a multiple of material retrieval movement lines 31 and 32 may be adopted by the material retrieval mechanism used. Each of the lines, movement line 31 for example, has a multiple of empty storage boxes, B111, B123, B212, B223 and B311 etc. for example, stock-piled in the designated area right next to the movement line itself. These empty spare storage boxes are arranged in the stock-piling area in a manner that can be easily accessible for the operators. Identification designations (B111 etc.) indicate the storage spaces (11 in FIG. 1A) in the storage rack (10 in FIG. 1A) where the particular storage box belongs to. For example, the storage box identified by B212 may indicate that it should be stored in the first upper space in the second vertical stack of the storage spaces in the first row of storage rack.

All the storage boxes stock-piled alongside the process movement lines 31, 32 and 33 or more not shown in the drawing are unique. Once all the empty storage boxes stock-piled are processed complete, a complete material distribution cycle to the production line is concluded. The division among the multiple movement lines 31, 32, . . . can be implemented in a manner in accordance with the time arrangement. For example, those materials to be processed with respect to the storage boxes stock alongside line 31 may be the first supply to the production line, and those alongside the second line 32 the second supply. This arrangement is made considering the convenience of overall operation.

Different types of material used for the production of computer and communication hardware products are frequently diverse and vast in number. Therefore, the batched process in different movement lines that can be performed simultaneously is an effective method to improve the raw material supply operation. The fact that material carts involved in the supply operation is, in most occasions, large in total number also makes it ideal to arrange multiple movement lines. Thus, instead of only one station 35 (foxed stations 13 in FIG. 1A) in the end of the one movement line, a multiple stations can be used as there are more than one movement lines. Those storage boxes conveyed to the stations 35 and finished their corresponding material retrieval operations may then be returned to their respective storage spaces in the storage rack, while those filled material carts can be distributed, probably in batches, to their corresponding designated work stations.

Before the material fetch operation begins, an operator input the production line identification information to the control computer system 34 that governs the inventory status in the storage and retrieval system described. The inventory control computer system 34, which is networked to other terminals in the work stations, informs the personnel at the related work station about the scheduled material supply operation. The information relayed may include the batch number as well as the cart identification for the first material cart. The control scheme also issues request to the automated material storage and retrieval system to retrieve and send the storage box stored in the storage space of the storage rack. The retrieval mechanism, accordingly, send the target storage box to the station. The related information is also relayed to the electronic label attached to the station so that an operator can implement the material fetch to the material cart correctly. After this is completed, the confirm button on the electronic label can be depressed to conclude the material retrieval in the designated storage box, which can then be returned to its storage space in the storage rack, so that a second storage box can be processed in the subsequent cycle.

The operator may then send the fetched cart to the left far end of the movement line in FIG. 3, and return to the control computer 34 for the information of the material retrieval in the next cycle. He or she then finds and gets the designated cart from the stock-pile of carts next to the movement line, and returns again to the station for another fetch of material in a subsequent material cart.

One measure indicates that the efficiency of material retrieval is directly proportional to the retrieval density, which is defined as the quotient of the number of accessed material box divided by the number of total number of material boxes in the entire movement line. As the total category of materials are increased significantly alone with the increase in the number of manufactured product types, the typical retrieval densities in most warehouse systems for products such as computer and communication hardware are frequently decreased to about 1 percent. In the described preferred embodiment of the material storage and retrieval system of the invention, with the assistance by the use of electronic labels, the retrieval density can be increased to substantially 100 percent, thereby greatly improving the retrieval efficiency.

In occasions when the production line manufactures very few or even single item of product, the original retrieval density can be very high at the first place. In this case, the automated warehousing facility such as the ASRS can be discarded altogether. This allows to greatly reduce the investment in the production facilities and costs to operate them. In this case, all the materials necessary for the production of the single or few product items can be simply stored in the material boxes directly stock-piled in the storage shelves alongside the movement lines, an arrangement similar to that of FIG. 3. In this case, as few as two layers of storage shelves as that depicted in the drawing of FIG. 3 can be used to store all the materials for the few types of product. Each of the station 35 in the movement line arrangement has its own assigned electronic label 36. The overall operation in the system is the same as the embodiment described above, with the operation involving multiple modes of material retrievals. The movement lines 31, 32 and 33 can be consecutive lines arranged in U-shaped connections.

When the product manufacturing activities are considered in the production facility of a computer and communication hardware vendor, in addition to the material input into and output out of the warehouse as reflected in the efficient maintenance of the inventory data, systematic considerations involving the integration of several sub-systems such as MRP are also necessary. In particular, all the factors concerning the production lines characteristics, work stations arrangement, material cart assignment, as well as the electronic labeling system used must all be covered. In order to further show the operation characteristics of such a highly-integrated system, a flow diagram depicting the control flow of the warehousing system in accordance with the preferred embodiment of the invention is examined.

As is illustrated in the flow diagram, an annual production planning is first laid out in step 41. This annual planning should include as much details as possible. A frequently used time unit used in the layout of the planning comes down to weeks of the year. Then, based on the annual planning, a master production schedule (MPS) is produced in step 42. To lay out this main production schedule, input information such as confirmed sales orders and projected sales orders are included. Then, based on the generated MPS, the material requirement planning (MRP) can be established in step 43. The essential factors for planning the MRP is the pursuit of timely procurement and delivery of materials used for the manufacture of products. In planning the MRP, input information including the product bill of materials (BOM) generated at step 44, as well as the inventory status established at step 45 are necessary. The generated MRP should also have outputs including, essentially, the purchase orders that can be relayed to the material suppliers at step 46 so that the suppliers can make their own planning. The MRP would also generate job orders that are issued directly to the production lines at step 49.

The MRP also generates output to the warehousing system, such as the automated storage and retrieval means based on the disclosure of the invention, which also receives inputs from the material supplier, in order to maintain at step 47 a precise inventory data that can provide feedbacks to the MRP. The ASRS thus provides its material storage and retrieval services to the production lines via dispatches of assigned material carts at step 48.

Thus, as persons skilled in the art may well appreciate, the above description of the preferred embodiment of the invention is intended only for the purpose of description, not for the limitation to the scope of the invention. Modifications to the outlined embodiment of the invention may be apparent and should be considered to be within the scope of the invention as recited in the claims which follow. For example, the material carts used in the described embodiments can be replaced by conveyer systems or other material delivery means (in this case, all the afore-mentioned terminology of "cart" must be changed into "delivery means"), or the material boxes used in the described embodiments can be replaced by used in the described embodiments can be replaced by other material storage means (in this case, all the afore-mentioned terminology of material "box" must be changed into material "storage means" ), or the electronic label system may employ a display unit of more or less than four digits. Besides, in addition to the symbol "→", any other symbols suitable for indicating a direction such as "⇒" or "→" or the word "TO" may be used as the "INTO" symbol. Further, the ASRS of the invention is also equally applicable to the manufacturing facilities of products other than the computer and communication hardware such as optical glasses. In the typical glass works where diversified product types of small quantities are ordered and manufactured, the application of the ASRS of the invention can provide an increase in the material handling efficiency up to 2 to 5 times as high.

What is claimed is:

1. An automated material storage and retrieval system for a production line, comprising:

a plurality of storage means each having at least one compartment;

an automated storage and retrieval means having a plurality of storage racks arranged in parallel, each of the storage racks having a plurality of storage spaces each used for storing one of the storage means;

at least one station each of the storage racks;

at least a mechanical access means installed alongside each of the storage racks, the mechanical access means being movable parallel to the corresponding storage rack, the mechanical access means having an access plate means which is vertically movable between the plurality of storage spaces of the storage rack for storing and retrieving the corresponding storage means in and from the respective storage space from and to the station; a governing computer system that maintains inventory data of the material handling system; and a plurality of electronic labeling means each located at the station of each of the storage racks, each of the electronic labeling means being coupled to the computer system and having at least a display unit for displaying material access information; whereby an operator of the material handling system implements material storage and retrieval accesses based on the information displayed by the display unit of the electronic labeling means.

2. An automated material handling process for retrieval in a production line which utilizes a plurality of electronic labeling means to pick up required materials from at least one single-type material storage means and place the picked up material into single-type delivery means, the material handling process comprising the step of: alternately displaying, at each of said electronic labeling means, two sets of material retrieval information, including a first set of "quantity of material retrieval" information and a second set of "INTO" symbol and "delivery identification number" information, wherein the "INTO" symbol indicates an instruction that the picked up material should be placed "into" the identified delivery means.

3. An automated material handling process for retrieval in a production line which utilizes a plurality of electronic labeling means to pick up required materials from at least one single-type material storage means and place the picked up material into multiple-type delivery means marked with at least one delivery identification number, the material handling process comprising the step of: alternately displaying, at each of said electronic labeling means, two sets of material retrieval information, including a first set of "quantity of material retrieval" information and a second set of "INTO" symbol, "delivery identification number", and "grid identification number" information, wherein the "INTO" symbol indicates an instruction that the picked up material should be placed "into" designated grid location in the identified delivery means.

4. An automated material handling process for retrieval in a production line which utilizes a plurality of electronic labeling means to pick up required materials from at least one single-type material storage means and place the picked up material into mixed-type delivery means marked with at least one delivery identification number, the material retrieval process comprising the step of: alternately displaying, at each of said electronic labeling means, two sets of material retrieval information, including a first set of "INTO" symbol and "delivery identification number" information and a second set of "grid identification number" information, wherein the "INTO" symbol indicates an instruction that the picked up material should be placed "into" the designated grid location in the identified delivery means.

5. An automated material handling process for retrieval in a production line which utilizes a plurality of electronic labeling means to pick up required materials from at least one multiple-type material storage means and place the picked up material into single-type delivery means marked with at least one delivery identification number, the material retrieval process comprising the step of: alternately displaying, at each of said electronic labeling means, two sets of material retrieval information, including a first set of "storage means compartment identification" and "retrieval quantity" information and a second set of "INTO" symbol and "delivery identification number" information, wherein the "INTO" symbol indicates an instruction that the picked up material should be placed "into" the designated delivery means.

6. An automated material handling process for retrieval in a production line which utilizes a plurality of electronic labeling means to pick up required materials from at least one multiple-type material storage means and place the picked up material into multiple-type delivery means marked with at least one delivery identification number, the material retrieval process comprising the step of: alternately displaying, at each of said electronic labeling means, two sets of material retrieval information, including a first set of "storage means compartment identification" and "retrieval quantity" information and a second set of "INTO" symbol, "delivery identification number" and "grid identification number" information, wherein the "INTO" symbol indicates an instruction that the picked up material should be placed "into" the designated grid location in the identified delivery means.

7. An automated material handling process for retrieval in a production line which utilizes a plurality of electronic labeling means to pick up required materials from at least one multiple-type material storage means and place the picked up material into mixed-type delivery means marked with at least one delivery identification number, the material retrieval process comprising the step of: alternately displaying, at each of said electronic labeling means, two sets of material retrieval information, including a first set of "storage means compartment identification", "INTO" symbol and "delivery identification number" information and a second set of "grid" identification number" information, wherein the "INTO" symbol indicates an instruction that the picked up material should be placed "into" the designated grid location in the identified delivery means.

* * * * *